United States Patent
Wang et al.

(10) Patent No.: US 10,028,273 B2
(45) Date of Patent: Jul. 17, 2018

(54) METHOD FOR INTERFERENCE COORDINATION, NETWORK SERVER AND COMMUNICATION SYSTEM USING THE SAME

(71) Applicant: INDUSTRIAL TECHNOLOGY RESEARCH INSTITUTE, Hsinchu (TW)

(72) Inventors: Chun-Chieh Wang, Kaohsiung (TW); Jun-Jie Su, Taoyuan (TW); Kuei-Li Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 75 days.

(21) Appl. No.: 14/948,236

(22) Filed: Nov. 20, 2015

(65) Prior Publication Data
US 2017/0150498 A1    May 25, 2017

(51) Int. Cl.
| | | |
|---|---|---|
| H04W 72/04 | (2009.01) | |
| H04W 16/10 | (2009.01) | |
| H04W 84/04 | (2009.01) | |
| H04W 16/32 | (2009.01) | |

(52) U.S. Cl.
CPC ....... *H04W 72/0446* (2013.01); *H04W 16/10* (2013.01); *H04W 72/0486* (2013.01); *H04W 16/32* (2013.01); *H04W 84/045* (2013.01)

(58) Field of Classification Search
None
See application file for complete search history.

(56) References Cited

U.S. PATENT DOCUMENTS

| | | |
|---|---|---|
| 6,590,878 B1 | 7/2003 | Uchida et al. |
| 8,682,313 B2 | 3/2014 | Kim et al. |
| 8,838,127 B2 | 9/2014 | Chen et al. |
| 2012/0113812 A1 | 5/2012 | Ji et al. |

(Continued)

FOREIGN PATENT DOCUMENTS

| | | |
|---|---|---|
| CN | 102186247 A | 9/2011 |
| CN | 103959689 A | 7/2014 |

(Continued)

OTHER PUBLICATIONS

S. Naga Sekhar Kshatriya et al., "On Interference Management based on Subframe Blanking in Heterogeneous LTE Networks", 978-1-4673-5494-3/13/ © 2013 IEEE. pp. 1-7, Jan. 2013.

(Continued)

*Primary Examiner* — Charles C Jiang
*Assistant Examiner* — Saad Khawar
(74) *Attorney, Agent, or Firm* — Rabin & Berdo, P.C.

(57) ABSTRACT

A method for interference coordination, a network server, and a communication system are provided. The method includes the following steps. A first macrocell almost blank subframe (ABS) pattern is received from a first macrocell. A second macrocell ABS pattern is received from a second macrocell. A first small cell ABS pattern for a first small cell is determined according to the first macrocell ABS pattern and the second macrocell ABS pattern. The first small cell ABS pattern is transmitted to the first small cell. The first small cell is within a coverage of the first macrocell.

21 Claims, 10 Drawing Sheets

(56) References Cited

U.S. PATENT DOCUMENTS

| | | | |
|---|---|---|---|
| 2013/0084865 A1* | 4/2013 | Agrawal | H04W 36/0083 455/436 |
| 2013/0107798 A1 | 5/2013 | Gao et al. | |
| 2013/0242748 A1 | 9/2013 | Mangalvedhe et al. | |
| 2013/0279419 A1* | 10/2013 | Li | H04W 24/02 370/328 |
| 2014/0004866 A1 | 1/2014 | Dalsgaard et al. | |
| 2014/0094181 A1* | 4/2014 | Kakinada | H04W 28/0236 455/446 |
| 2014/0169200 A1 | 6/2014 | Woo | |
| 2014/0256341 A1 | 9/2014 | Nayeb Nazar et al. | |
| 2014/0269565 A1 | 9/2014 | Chou | |
| 2014/0378135 A1 | 12/2014 | Koide | |
| 2015/0099522 A1 | 4/2015 | Yie et al. | |
| 2015/0131553 A1 | 5/2015 | Centonza et al. | |
| 2015/0207596 A1 | 7/2015 | Kroener et al. | |
| 2015/0312901 A1 | 10/2015 | Yoshizawa et al. | |
| 2016/0066191 A1* | 3/2016 | Li | H04W 72/082 455/443 |

FOREIGN PATENT DOCUMENTS

| | | |
|---|---|---|
| EP | 2833661 A1 | 2/2015 |
| TW | 201438419 A | 10/2014 |
| WO | WO 2014-146711 A1 | 9/2014 |

OTHER PUBLICATIONS

An Liu et al., "Hierarchical Radio Resource Optimization for Heterogeneous Networks With Enhanced Inter-Cell Interference Coordination (eICIC)",pp. 1684-1693, IEEE Transactions on Signal Processing, vol. 62, No. 7, Apr. 1, 2014.

Xibo Wang et al., "Reduced Power Centralized eICIC for LTE-Advanced Heterogeneous Networks", pp. 743-747, proceedings of IEEE/CIC ICCC 2014 Symposium on Wireless Communications Systems.

Zanyu Chen et al., "Multi-Tone Almost Blank Subframes for Enhanced Inter-Cell Interference Coordination in LTE HetNets", pp. 1014-1018, proceedings of International Conference on Computing, Networking and Communications, Wireless Networks Symposium, Feb. 2015.

Hyoungju Ji et al., "Dynamic Resource Adaptation in Beyond LTE-A TDD Heterogeneous Networks", pp. 133-137, proceedings of IEEE International Conference on Communications, IEEE ICC'13—Workshop Beyond LTE-A, Jun. 2013.

Rui Han et al., "Joint Power Reduction and Time-Domain Scheduling for Interference mitigation in Macro-Pico Heterogeneous Networks with Differential Evolution", pp. 1-5, 978-1-4673-6337-2/13 © 2013 IEEE, Jun. 2013.

S. Schuetz et al., "Autonomic and Decentralized Management of Wireless Access Networks", pp. 96-106, IEEE Transactions on Network and Service Management, vol. 4, No. 2, Sep. 2007.

3GPP, "3rd Generation Partnership Project; Technical Specification Group Services and System Aspects; Telecommunication Management; Self-Organizing Networks (SON); Concepts and requirements (Release 10)", pp. 1-14, 3GPP TS 32.500 V10.0.0, Jun. 2010.

Anders Dahlén et al.,"Evaluations of LTE Automatic Neighbor Relations", pp. 1-5, 978-1-4244-8331-0/11/ © 2011 IEEE May 2011.

Andreas Webet el al., "Scheduling Strategies for HetNets using eICIC", pp. 6787-6791, proceedings—International Workshop on Small Cell Wireless Networks 2012, Jun. 2012.

Chang Li et al., "User-Centric Intercell Interference Coordination in Small Cell Networks" pp. 5747-5752, IEEE Dept. of ECE, The Hong Kong University of Science and Technology, Jun. 2014.

Eunmi Chu et al., "Self-organizing and Self-healing Mechanisms in Cooperative Small-cell Networks", pp. 1576-1581, proceedings pf 2013 IEEE 24th International Symposium on Personal, Indoor and Mobile Radio Communications: MAC and Cross-Layer Design Track 978-1-9-2013.

An Liu et al., "Hierarchical Radio Resource Optimization for Heterogeneous Networks with Dynamic ABS", 978-1-4673-3122-7/13/ IEEE pp. 5194-5198, Jun. 2013.

Extended European Search Report dated Apr. 5, 2017.

Taiwanese Office Action dated Jun. 26, 2017.

Chinese Office Action dated Feb. 14, 2018.

* cited by examiner

METHOD FOR INTERFERENCE COORDINATION, NETWORK SERVER AND COMMUNICATION SYSTEM USING THE SAME

TECHNICAL FIELD

The disclosure relates in general to a method for interference coordination, and more particularly to a method for interference coordination related to macrocells and a network server.

BACKGROUND

With the growth of mobile communication, in order to provide in-building and outdoor wireless service, mobile operators use small cells to extend their service coverage and increase network capacity. Small cells may be radio access nodes, for example, having a range of 10 meters to 2 kilometers, as compared to a macrocell, for example, having a range of a few tens of kilometers. Examples of small cells include femtocells, picocells, and microcells. In 3rd Generation Partnership Project (3GPP) terminology, a Node B (NB) is a 3G macrocell, an eNode B (eNB) is a Long Term Evolution (LTE) macrocell, a Home Node B (HNB) is a 3G femtocell, and a Home eNode B (HeNB) is a LTE femtocell.

As wireless networks become increasingly dense to accommodate the rising traffic demand, inter-cell interference becomes one of the critical issues. Specifically, with an increasing number of small cells, deployment of small cells becomes denser and thus the distance between small cells becomes shorter. A user equipment (UE), such as a mobile phone, served by a serving cell may suffer from interference caused by a neighboring small cell. For example, when UE is near boundary of the serving cell, signal from neighboring cell acts as interferer. The Signal-to-Noise ratio (SNR) may be poor not only because of the weak signal strength from the serving cell but also because of the interference. Thus, there is a need for a method for interference coordination.

SUMMARY

The disclosure is directed to a method for interference coordination, a network server and a communication system using the same.

According to one embodiment, a method for interference coordination is provided. The method includes: receiving a first macrocell almost blank subframe (ABS) pattern from a first macrocell, receiving a second macrocell ABS pattern from a second macrocell, determining a first small cell ABS pattern for a first small cell according to the first macrocell ABS pattern and the second macrocell ABS pattern, and transmitting the first small cell ABS pattern to the first small cell. The first small cell is within a coverage of the first macrocell.

According to another embodiment, a network server is provided. The network server includes an ABS pattern management unit and a coordination unit. The ABS pattern management unit is configured to receive a first macrocell ABS pattern from a first macrocell, receive a second macrocell ABS pattern from a second macrocell, and transmit a first small cell ABS pattern to a first small cell. The coordination unit is configured to determine the first small cell ABS pattern for the first small cell according to the first macrocell ABS pattern and the second macrocell ABS pattern. The first small cell is within a coverage of the first macrocell.

According to still another embodiment, a communication system is provided. The communication system includes a network server, a first macrocell, a second macrocell, and a first small cell. The first macrocell is connected to the network server and is configured to transmit a first macrocell ABS pattern to the network server. The second macrocell is connected to the network server and is configured to transmit a second macrocell ABS pattern to the network server. The first small cell is connected to the network server and is within a coverage of the first macrocell. The network server is configured to determine a first small cell ABS pattern for the first small cell according to the first macrocell ABS pattern and the second macrocell ABS pattern, and transmit the first small cell ABS pattern to the first small cell.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In a heterogeneous network (HetNet) where a macrocell and a small cell coexist, a UE located near the boundary of the coverage of a small cell may suffer from interference induced from the macrocell. 3GPP has proposed enhanced inter-cell interference coordination (eICIC) to deal with this problem. An almost blank subframe (ABS) is used in eICIC to prevent the small cell from transmitting data at the same time as the serving macrocell. UEs connected to the small cell can thus receive data during such ABS to avoid interference from the macrocell. For example, the macrocell may inform the small cell an ABS pattern to let the small cell know which time slots are available for data transmission. The macrocell serves as the control center to determine an ABS pattern for the small cells in its coverage area to prevent interference. However, there may still be inter-cell interference when two neighboring macrocells use different ABS patterns.

Figure 1:
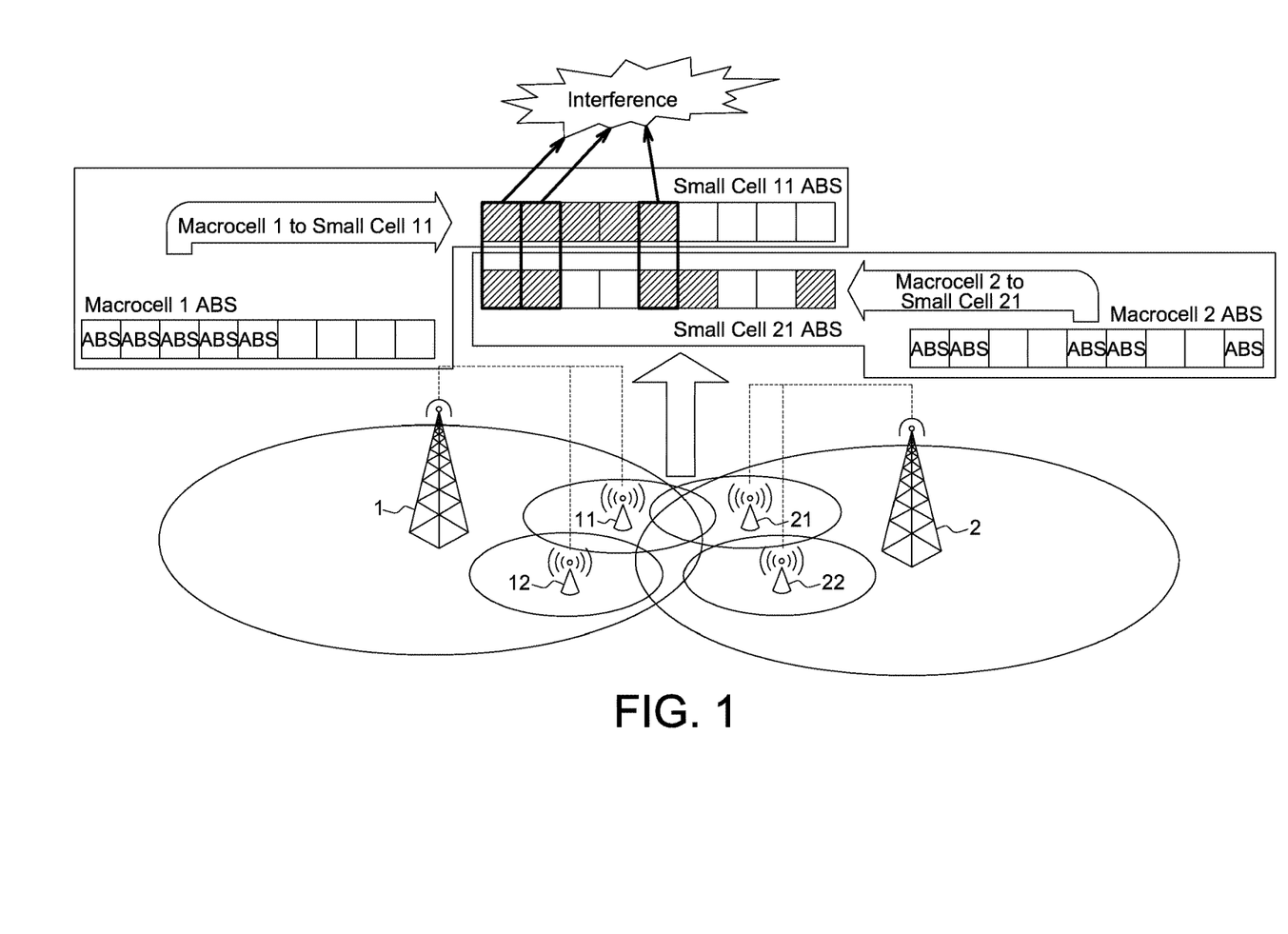
FIG. 1 shows an example of interference between two neighboring small cells.

FIG. 1 shows an example of interference between two neighboring small cells. In this example, small cell 11 and small cell 12 are in the coverage of the macrocell 1. Small cell 21 and small cell 22 are in the coverage of the macrocell 2. The coverage of a cell in this disclosure may be the area where received pilot signal strength from this cell is higher than a sensitive threshold of a mobile device. The macrocell 1 sets the ABS pattern as {111110000} for the small cells 11 and 12 (the '1' in the ABS pattern represents an ABS in which the small cell can transmit data). The macrocell 2 sets the ABS pattern as {110011001} for the small cells 21 and 22. As a result, the small cell 11 and the small cell 21 may transmit data simultaneously in the $1^{st}$, $2^{nd}$, and $5^{th}$ subframe. Therefore a UE in the intersection of the coverage areas of the small cells 11 and 21 may suffer from interference between these two small cells.

Figure 2:
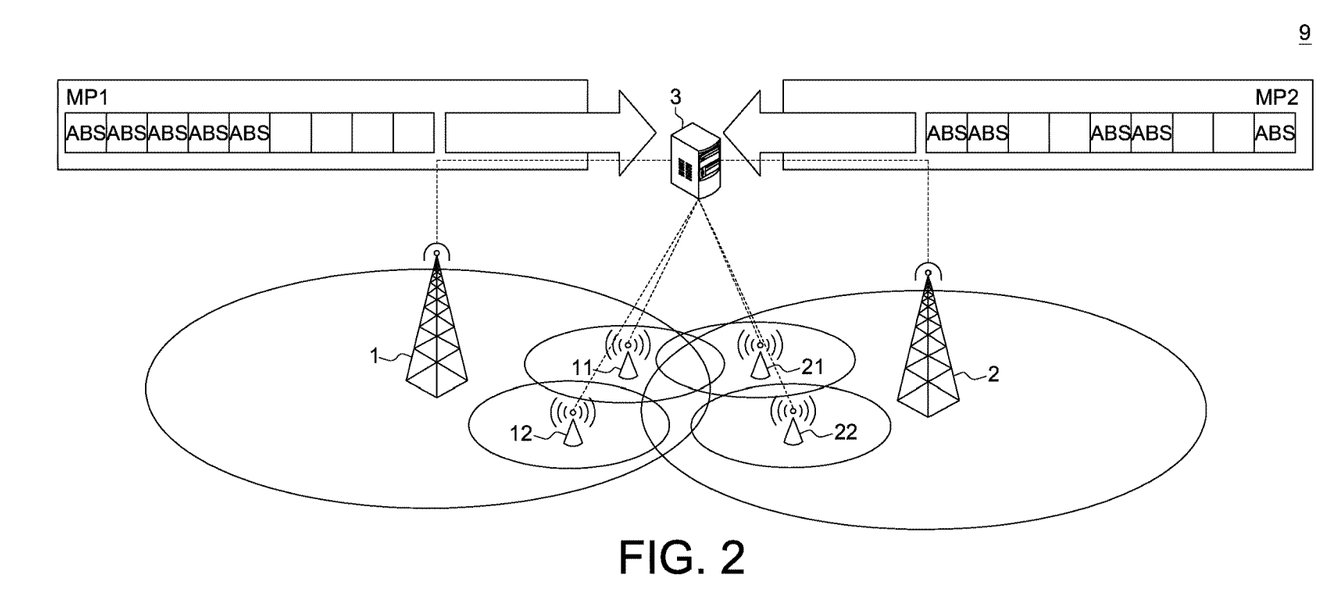
FIG. 2 shows a communication system according to an embodiment of this disclosure.

FIG. 2 shows a communication system 9 according to an embodiment of this disclosure. The communication system 9 includes a network server 3, macrocells 1 and 2, small cells 11, 12, 21, and 22. In this example, two macrocells and four small cells are shown in the system. However, the number of macrocells and small cells are not limited thereto. There may also be two macrocells and one small cell in the communication system 9. The network server 3 may be connected to the macrocells 1 and 2 via the backhaul network, such as being connected via X2 interface as defined in 3GPP specification. The network server 3 may also be connected to the small cells 11, 12, 21 and 22 via the backhaul network.

For example, the network server 3 may be a self-organizing network (SON) server. A SON is an automation technology designed to make the planning, configuration, management, optimization and healing of mobile radio access networks simpler and faster. The network server 3 acts as a mediator between the macrocells 1, 2 and the small cells 11, 12, 21, and 22. Thus, the network server 3 is able to integrate different ABS patterns information from the macrocells 1 and 2, and send appropriate control messages to the small cells 11, 12, 21, and 22, in order to avoid interference between neighboring small cells. The detailed description is given below.

Figure 3:
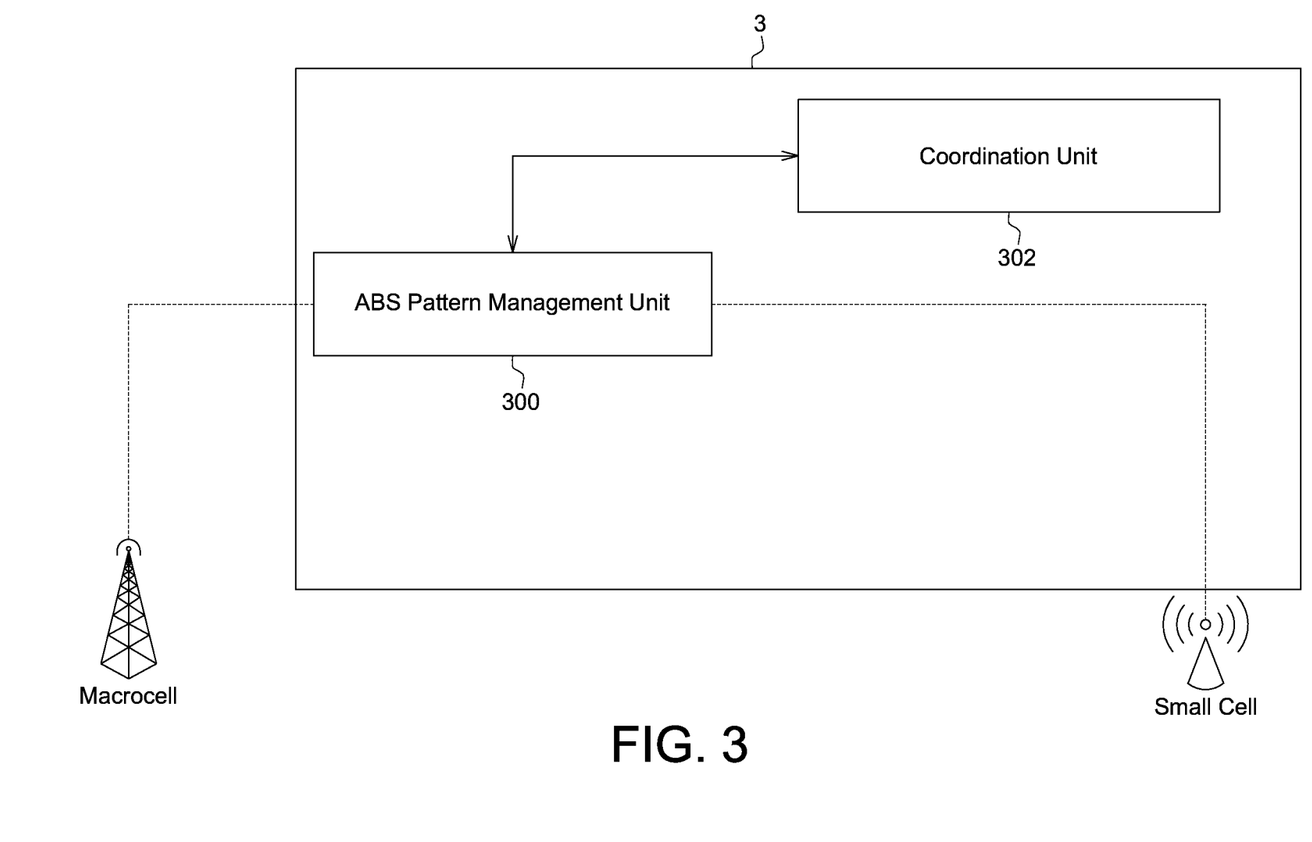
FIG. 3 shows a block diagram illustrating a network server according to an embodiment of this disclosure.

FIG. 3 shows a block diagram illustrating a network server 3 according to an embodiment of this disclosure. Referring to FIG. 2 and FIG. 3, the network server 3 includes an ABS pattern management unit 300 and a coordination unit 302. The ABS pattern management unit 300 is configured to receive a first macrocell ABS pattern MP1 from a first macrocell 1, receive a second macrocell ABS pattern MP2 from a second macrocell 2, and transmit a first small cell ABS pattern SP1 to a first small cell 11. The coordination unit 302 is configured to determine the first small cell ABS pattern SP1 for the first small cell 11 according to the first macrocell ABS pattern MP1 and the second macrocell ABS pattern MP2. The ABS pattern management unit 300 and the coordination unit 302 may be implemented by software, firmware, or hardware. For example, the ABS pattern management unit 300 and the coordination unit 302 may be functional modules in a software program. The software program may be loaded from a memory device and executed by a processor. Alternatively the ABS pattern management unit 300 and the coordination unit 302 may also be circuit blocks with the corresponding functions, such as application specific integrated circuits.

Figure 4:
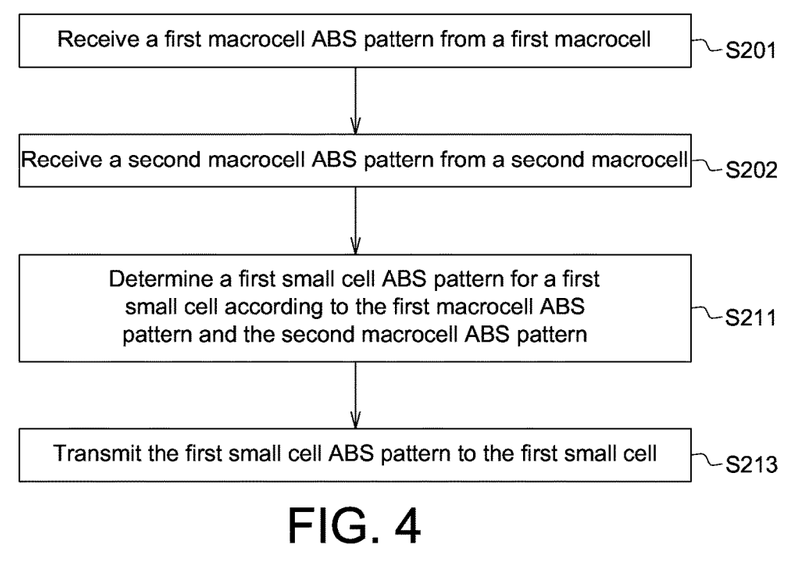
FIG. 4 shows a flowchart illustrating an interference coordination method according to an embodiment of this disclosure.

Also refer to FIG. 4, which shows a flowchart illustrating an interference coordination method according to an embodiment of this disclosure. Referring to FIG. 2, FIG. 3, and FIG. 4, the flowchart may correspond to the steps performed by the network server 3. The interference coordination method includes the following steps: Step S201 receiving a first macrocell ABS pattern MP1 from a first macrocell 1. Step S202 receiving a second macrocell ABS pattern MP2 from a second macrocell 2. Step S211 determining a first small cell ABS pattern SP1 for a first small cell 11 according to the first macrocell ABS pattern MP1 and the second macrocell ABS pattern MP2. Step S213 transmitting the first small cell ABS pattern SP1 to the first small cell 11. In one embodiment, the steps S201, S202, and S213 may be performed by the ABS pattern management unit 300, and the step S211 may be performed by the coordination unit 302. It should be noted that the step order shown in FIG. 4 is just exemplary rather than limiting.

Figure 5:
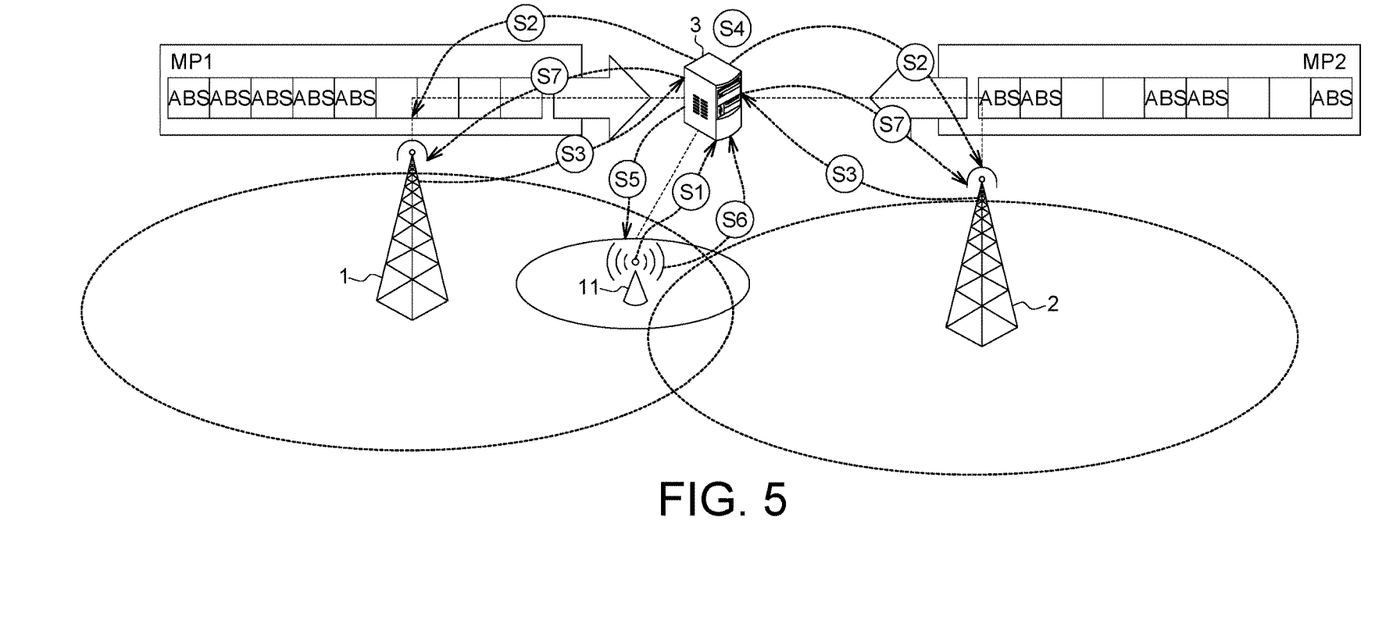
FIG. 5 shows a diagram illustrating a process of interference coordination according to an embodiment of this disclosure.

For a better understanding of the interference coordination method mentioned above, FIG. 5 shows a diagram illustrating a process of interference coordination according to an embodiment of this disclosure. Numbers 1-7 shown in the circles represent the steps executed in sequence in this exemplary process. In the following description, these numbers will be represented as steps S1-S7. It should be noted that the step order shown in FIG. 5 is just exemplary rather than limiting.

Step S1: the first small cell 11 transmits a first request Req1 for ABS pattern information to the network server 3. For example, the first small cell 11 may need to know what ABS pattern is available from its belonging first macrocell 1 in order to communicate with a UE with an appropriate ABS pattern.

Step S2: upon receiving the first request Req1 from the first small cell 11, the network server 3 transmits a second request Req2 for the ABS pattern information to the first macrocell 1 in response to the first request Req1. In other words, the first small cell 11 does not send a request for the ABS pattern information directly to the first macrocell 1. Instead, the network sever 3 receives requests from the first small cell 11 and transmits the requests to the first macrocell 1. In addition, the network server 3 knows that the coverage of the first macrocell 1 overlaps the coverage of the second macrocell 2, and hence the network server 3 may also transmit a request for the ABS pattern information to the second macrocell 2 in response to the first request Req1. Also note that the process performed in the steps S1 and S2 is not mandatory. For example, the first macrocell 1 and the second macrocell 2 may also actively (or periodically) transmit the ABS pattern without waiting for a request for the ABS pattern information.

Step S3: the first macrocell 1 determines the first macrocell ABS pattern MP1 and then transmits the first macrocell ABS pattern MP1 to the network server 3 (corresponding to the step S201 in FIG. 4). Similarly, the second macrocell 2 determines the second macrocell ABS pattern MP2 and then transmits the second macrocell ABS pattern MP2 to the network server 3 (corresponding to the step S202 in FIG. 4). The macrocells 1 and 2 do not send the ABS pattern information directly to the small cells in their respective coverage. Instead, the ABS patterns are first sent to the network server 3, such that the ABS patterns from the two macrocells are integrated.

Step S4: upon receiving the first macrocell ABS pattern MP1 and the second macrocell ABS pattern MP2, the network server 3 determines a first small cell ABS pattern SP1 for the first small cell 11 according to the first macrocell ABS pattern MP1 and the second macrocell ABS pattern MP2 (corresponding to the step S211 in FIG. 4). Because the network server 3 now knows ABS pattern information in both the macrocells, the network server 3 is able to determine ABS patterns for the small cells in respective macrocell's coverage in order to avoid inter-cell interference. There may be various ways for the network server 3 to determine the first small cell ABS pattern SP1. Examples will be given in the following description.

Step S5: the network server 3 transmits the first small cell ABS pattern SP1 to the first small cell 11 (corresponding to the step S213 in FIG. 4). The first small cell 11 then knows which time slots are available for data transmission. Moreover, because the first small cell ABS pattern SP1 implicitly possesses interference avoidance information, a UE communicating with the first small cell 11 will not be interfered by another neighboring small cell within the coverage of the second macrocell 2.

Step S6: the first small cell 11 transmits a first selected ABS pattern CP1 to the network server 3 in response to the first small cell ABS pattern SP1. In other words, the first small cell 11 reports its usage information to the network server 3. The first selected ABS pattern CP1 may include which time slots in the first small cell ABS pattern SP1 are chosen for data transmission by the first small cell 11. For example, there may be three ABS in the first small cell ABS pattern SP1, and the first small cell 11 may choose two out of the three ABS for data transmission. These two chosen ABS are reported in the first selected ABS pattern CP1.

Step S7: the network server 3 transmits the first selected ABS pattern CP1 to the first macrocell 1 and/or the second macrocell 2. Therefore the first macrocell 1 and/or the second macrocell 2 know the actual ABS usage information of the first small cell 11, for example, which time slots are occupied by the first small cell 11. The first macrocell 1 and/or the second macrocell 2 can then determine an updated ABS pattern for another small cell in their coverage areas.

In the above example, the network server 3 serves as a communication bridge between the first macrocell 1 and the first small cell 11, and also serves as a communication bridge between the second macrocell 2 and the first small cell 11. Because the first small cell 11 transmits request to the network server 3 and receives ABS pattern from the network server 3, the network server 3 acts like a macrocell from the viewpoint of the first small cell 11. On the other hand, because the first macrocell 1 (and the second macrocell 2) receives request from the network server 3 and transmits ABS pattern to the network server 3, the network server 3 acts like a small cell from the viewpoint of the first macrocell 1 (and the second macrocell 2). The network server 3 thus emulates the functions of both a macrocell and a small cell.

Figure 6:
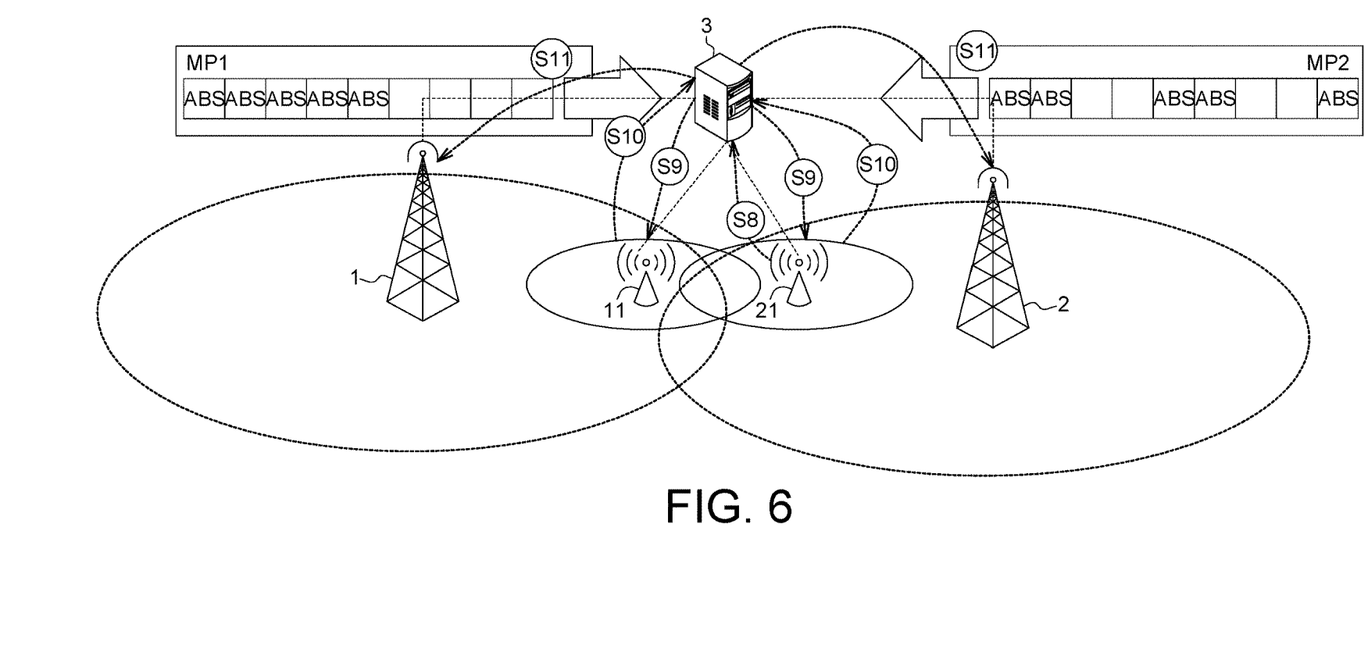
FIG. 6 shows a diagram illustrating a process of interference coordination according to an embodiment of this disclosure.

FIG. 6 shows a diagram illustrating a process of interference coordination according to an embodiment of this disclosure. The process is similar to that shown in FIG. 5 and the numbers in circles also represent the steps executed in sequence. The numbers in FIG. 6 will be represented as steps S8-S11 in the following description. Note that different numbers are used here to avoid confusion to those used in FIG. 5. However, the numbers shown in FIG. 6 and the numbers shown in FIG. 5 do not indicate a strict step order. For example, the step S8 shown in FIG. 6 may also be performed before the step S1 shown in FIG. 5.

In this embodiment, there are two small cells 11 and 21. The first small cell 11 is within the coverage of the first macrocell 1 and the second small cell 21 is within the coverage of the second macrocell 2. The coverage of the first small cell 11 overlaps the coverage of the second small cell 21. Interference coordination may be needed for a UE located in the overlapped region between the first small cell 11 and the second small cell 21 to provide a better communication quality. Some additional steps are shown in FIG. 6 as compared to FIG. 5.

Step S8: the second small cell 21 transmits a third request Req3 for ABS pattern information to the network server 3 (similar to the step S1). Step S9: the network server 3 determines a first small cell ABS pattern SP1 for the first small cell 11 according to the first macrocell ABS pattern MP1 and the second macrocell ABS pattern MP2. The network server 3 transmits the first small cell ABS pattern SP1 to the first small cell 11. In addition, the network server 3 determines a second small cell ABS pattern SP2 for the second small cell 21 according to the first macrocell ABS pattern MP1 and the second macrocell ABS pattern MP2. The network server 3 transmits the second small cell ABS pattern SP2 to the second small cell 21 (similar to the steps S4 and S5). Step S10: the first small cell 11 transmits a first selected ABS pattern CP1 to the network server 3 in response to the first small cell ABS pattern SP1, and the second small cell 21 transmits a second selected ABS pattern CP2 to the network server 3 in response to the second small cell ABS pattern SP2 (similar to the step S6). Step S11: the network server 3 transmits the second selected ABS pattern CP2 and/or the first selected ABS pattern CP1 to the second macrocell 2 and/or the first macrocell 1 (similar to the step S7).

In this embodiment, because the network server 3 has ABS pattern information from both the first macrocell 1 and the second macrocell 2, the first small cell ABS pattern SP1 thus determined would be consistent with the first macrocell ABS pattern MP1. Likewise, the second small cell ABS pattern SP2 would be consistent with the second macrocell ABS pattern MP2. Furthermore, the network server 3 serves as a mediator between the first small cell 11 and the second small cell 21 to coordinate the inter-cell interference. By using the first small cell ABS pattern SP1 and the second small cell ABS pattern SP2, the first small cell 11 and the second small cell 21 that are close to each other may use different time slots for data transmission, thus the inter-cell interference would be prevented.

Figure 7:
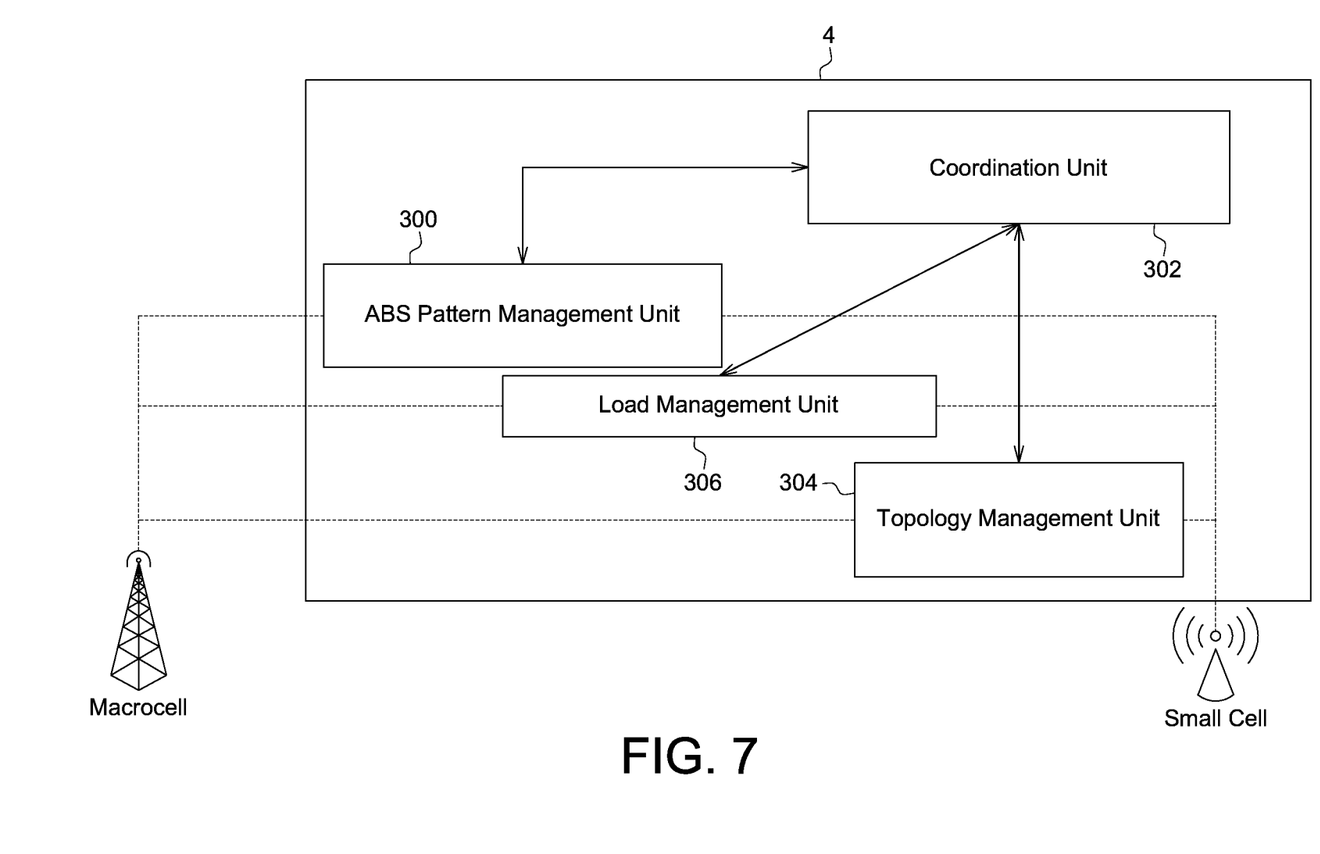
FIG. 7 shows a block diagram illustrating a network server according to an embodiment of this disclosure.

In the following is given a description of the determination of the first small cell ABS pattern SP1 and the second small cell ABS pattern SP2. FIG. 7 shows a block diagram illustrating a network server 4 according to an embodiment of this disclosure. As compare to the network server 3 shown in FIG. 3, the network server 4 further includes a topology management unit 304 and a load management unit 306. The topology management unit 304 and the load management unit 306 may also be implemented by software, firmware, or hardware.

Referring to FIG. 5, FIG. 6, and FIG. 7, the topology management unit 304 is configured to obtain interference relationship between the first macrocell 1, the second macrocell 2, the first small cell 11 and the second small cell 21. The coordination unit 302 determines the first small cell ABS pattern SP1 and the second small cell ABS pattern SP2 according to the interference relationship. The interference relationship may refer to whether or not the coverage of the individual cell overlaps with each other.

The load management unit 306 is configured to receive a first load information from the first small cell 11 and receive a second load information from the second small cell 21. The first load information may include the number of serving UEs and the required bandwidth of the first small cell 11. Refer to FIG. 5, the first load information may be encompassed in the first request Req1 transmitted in the step S1. The first macrocell 1 is then able to determine how many resources can be allocated to the first small cell 11 depending on the first load information. Similarly, the second load information may include the number of serving UEs and the required bandwidth of the second small cell 21. Refer to FIG. 6, the second load information may be encompassed in the third request Req3 transmitted in the step S8. In addition, the coordination unit 302 of the network server 4 determines the first small cell ABS pattern SP1 and the second small cell ABS pattern SP2 according to the first load information and the second load information.

Figure 8:
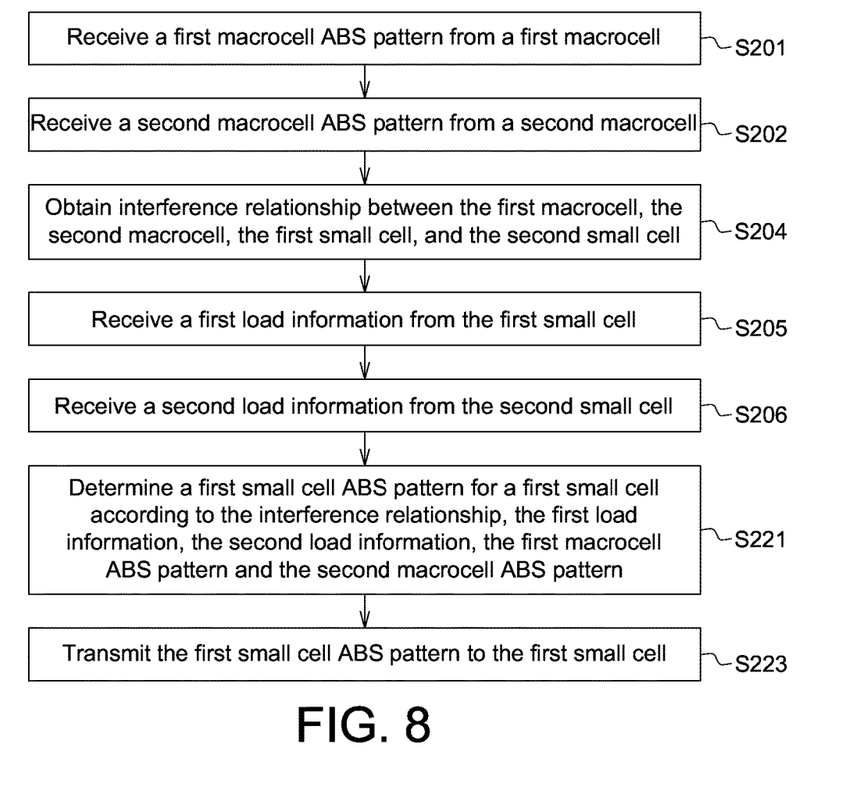
FIG. 8 shows a flowchart illustrating an interference coordination method according to an embodiment of this disclosure.

Also refer to FIG. 8, which shows a flowchart illustrating an interference coordination method according to an embodiment of this disclosure. The flowchart may correspond to the steps performed by the network server 4 in FIG. 7. Referring to FIG. 5, FIG. 6, FIG. 7 and FIG. 8, the interference coordination method includes the following step: Step S201 receiving a first macrocell ABS pattern MP1 from a first macrocell 1. Step S202 receiving a second macrocell ABS pattern MP2 from a second macrocell 2. Step S204 obtaining interference relationship between the first macrocell 1, the second macrocell 2, the first small cell 11, and the second small cell 21. Step S205 receiving a first load information from the first small cell 11. Step S206 receiving a second load information from the second small cell 21. Step S221 determining the first small cell ABS pattern SP1 for the first small cell 11 according to the interference relationship, the first load information, the second load information, the first macrocell ABS pattern MP1 and the second macrocell ABS pattern MP2. Step S223 transmitting the first small cell ABS pattern SP1 to the first small cell 11. In one embodiment, Step S221 also determining the second small cell ABS pattern SP2 for the second small cell 21 according to the interference relationship, the first load information, the second load information, the first macrocell ABS pattern MP1 and the second macrocell ABS pattern MP2. In one embodiment, the steps S201, S202, and S223 may be performed by the ABS pattern management unit 300, the steps S204 may be performed by the topology management unit 304, the steps S205 and S206 may be performed by the load management unit 306, and the step S221 may be performed by the coordination unit 302. It should be noted that the step order shown in FIG. 8 is just exemplary rather than limiting.

As described above, the interference relationship may refer to the overlapping between the coverage of each cell, which is related to the neighboring cells of each cell. Such neighbor cell information may be obtained in various ways. For example, when the cell (either a macrocell or a small cell) boots up, the cell may detect its neighboring cells. In addition, since UE detects all the cells around it, the cell may instruct UE to perform measurement and check the existence of neighboring cells. The cell then may extract the neighboring cell information from UE. Such procedure is, for example, the automatic neighbor relation (ANR) functionality defined in the 3GPP specification.

Figure 9:
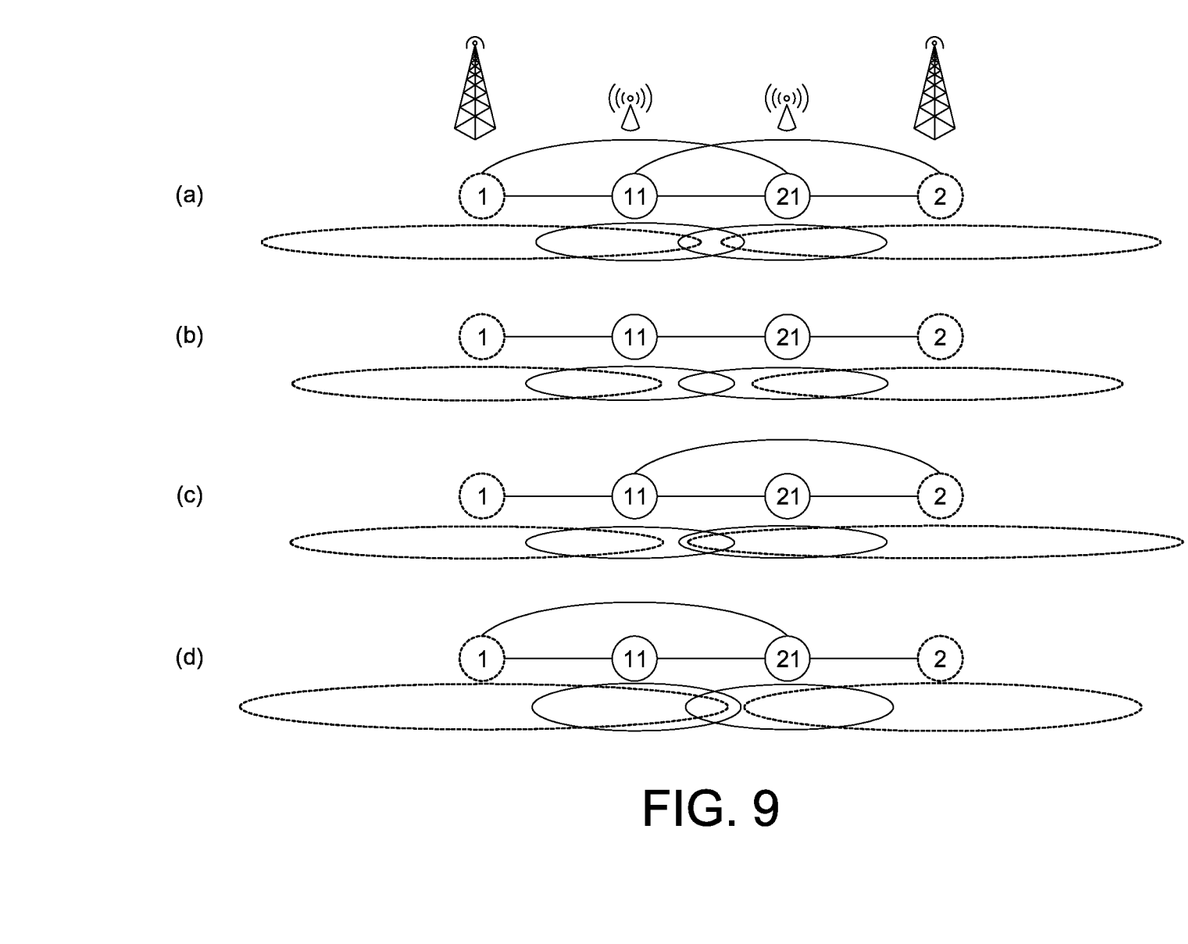
FIG. 9 shows multiple scenarios regarding different interference relationships between macrocells and small cells.

The topology management unit 304 in FIG. 7 may construct a graph or a topology corresponding to the obtained interference relationship. FIG. 9 shows multiple scenarios regarding different interference relationships between macrocells and small cells. A macrocell and a small cell are represented as nodes in the graph. The coverage of a macrocell is shown in dashed lines, while the coverage of a small cell is shown in solid lines in FIG. 9. Four example topologies are shown in FIG. 9 corresponding to four different interference relationships. Scenario (a): the coverage of the first macrocell 1 overlaps both the coverage of the first small cell 11 and the coverage of the second small cell 21. The coverage of the second macrocell 2 also overlaps both the coverage of the first small cell 11 and the coverage of the second small cell 21. Scenario (b): the coverage of the first macrocell 1 overlaps the coverage of the first small cell 11 but not the coverage of the second small cell 21. The coverage of the second macrocell 2 overlaps the coverage of the second small cell 21 but not the coverage of the first small cell 11. Scenario (c): the coverage of the first macrocell 1 overlaps the coverage of the first small cell 11 but not the coverage of the second small cell 21. The coverage of the second macrocell 2 overlaps both the coverage of the first small cell 11 and the coverage of the second small cell 21. Scenario (d): the coverage of the first macrocell 1 overlaps both the coverage of the first small cell 11 and the coverage of the second small cell 21. The coverage of the second macrocell 2 overlaps the coverage of the second small cell 21 but not the coverage of the first small cell 11. In all of these four example scenarios, the coverage of the first small cell 11 overlaps the coverage of the second small cell 21. Based on the topology, the coordination unit 302 determines how to assign appropriate ABS patterns to avoid interference caused by the overlapping areas shown in the graph.

Figure 10:
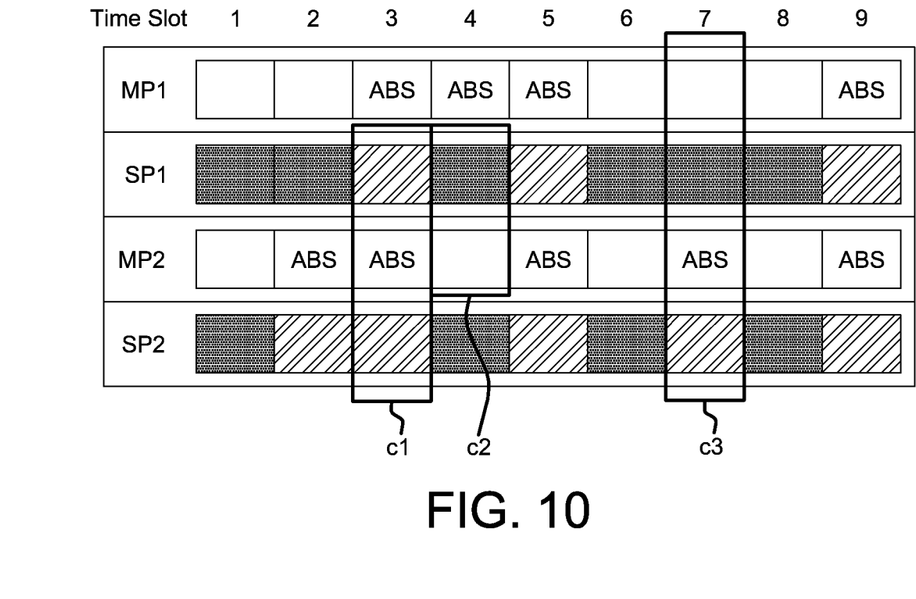
FIG. 10 shows an example of the classification of time slots in the ABS patterns.

FIG. 10 shows an example of the classification of time slots in the ABS patterns. Take scenario (c) in FIG. 9 for example, each time slot in the ABS pattern may be categorized into a number of different classes. $3^{rd}$ time slot: both the first macrocell ABS pattern MP1 and the second macrocell ABS pattern MP2 are ABS, both the small cells 11 and 21 may choose this time slot for data transmission. However, because there is an overlapping area between the first small cell 11 and the second small cell 21, interference happens if these two cells both transmit data in the $3^{rd}$ time slot. Coordination is needed to determine which small cell transmits data in this time slot. Class c1 represents a time slot in which exactly one of the two small cells 11 and 21 may transmit.

$4^{th}$ time slot: the second macrocell ABS pattern MP2 is not an ABS, therefore the second macrocell 2 transmits data at the $4^{th}$ time slot. Because there is an overlapping area between the first small cell 11 and the second macrocell 2, the first small cell 11 cannot use the $4^{th}$ time slot for data transmission although the first macrocell ABS pattern MP1 is an ABS in the $4^{th}$ time slot. Class c2 represents a time slot which a small cell is forbidden to transmit data because of the interference from a neighboring macrocell.

$7^{th}$ time slot: the second macrocell ABS pattern MP2 is an ABS while the first macrocell ABS pattern MP1 is not an ABS. Because there is no overlapping area between the first macrocell 1 and the second small cell 21, the second small cell 21 is free to choose this time slot. There will be no interference because the first small cell 11 does not transmit data and the first macrocell 1 does not interfere with the second small cell 21. Class c3 represents a time slot which a small cell is free to choose without causing interference.

After the time slots have been classified, the first and second small cell ABS patterns SP1 and SP2 may be determined according to the interference relationship. The determination may be performed by the coordination unit 302. In the above example, time slots belonging to the class c1 need to be coordinated, thus the coordination unit 302 may determine that the first small cell 11 may use the $3^{rd}$ time slot while the second small cell 21 is prevented from using the $3^{rd}$ time slot, or vice versa.

As described above, the interference coordination method may include: identifying first free time slots for the first small cell 11, second free time slots for the second small cell 21 (free time slots correspond to the class c3), and contested time slots (contested time slots correspond to the class c1) according to the first macrocell ABS pattern MP1, the second macrocell ABS pattern MP2, and the interference relationship. Note that in the above described procedure, the first and second load information is not necessarily needed for the determination.

In one embodiment, the first and second load information may further be taken into consideration. The interference coordination method may further include: distributing the contested time slots for the first small cell 11 and the second small cell 21 according to the first load information, the second load information, the first free time slots, the second free time slots, and the contested time slots. For example, if a small cell has a heavier loading, such as serving more UEs, more time slots may be distributed to that small cell.

One exemplary procedure regarding the distribution of the contested time slots may be expressed as (the symbol # will be used to represent the meaning of "the number of" in the following description):
1. Calculate the required number of iterations.

Iteration $N$=(total load amount)/(# usable ABS)

usable ABS means time slots belonging to class c1 or c3
2. Calculate the load amount that needs coordination for each small cell.

load amount needing coordination for
cell $i$ $LC(i)$=Load($i$)−(# class $c3$ slots)*$N$ Load($i$) means the load of the small cell i
3. Distribute contested time slots according to the load ratio.

load ratio $R$=$LC(1)/LC(2)$

One example is given below. The related parameters of the first small cell 11 and the second small cell 21 are shown in Table 1. The load parameters shown in Table 1 represent how many time slots are required for each small cell, which may correspond to the session loading required by its serving UEs. According to the above procedure, iteration N=(total load amount)/(# usable ABS)=(40+80)/(1+2+3)=20. The load amount that needs coordination for the first small cell 11 LC(11)=Load(11)−(# class c3 slots)*N=40−1*20=20. The load amount that needs coordination for the second small cell 21 LC(21)=Load(21)−(# class c3 slots)*N=80−2*20=40. Load ratio R=LC(11)/LC(21)=20/40=½. Because the number of contested time slots (class c1) in each iteration is equal to 3, the first small cell 11 can use 1 time slot and the second small cell 21 can use 2 time slots according to the load ratio R.

TABLE 1

| | Load | # ABS that can be freely chosen (class c3) | # ABS that need coordination (class c1) |
|---|---|---|---|
| First small cell 11 | 40 | 1 | 3 |
| Second small cell 21 | 80 | 2 | |

Two small cells are taken for example in the above procedure. However, the interference coordination method provided in this disclosure may also be applicable to three or more small cells. For example, the load ratio R may be in the form of LC(1):LC(2):LC(3) when there are three small cells. In summary, the network server in this disclosure acts as a mediator for multiple neighboring small cells to determine their ABS patterns. In addition, the network server may collect ABS pattern information from multiple macrocells, collect load information form multiple small cells, and obtain interference relationship between the macrocells and the small cells, in order to generate appropriate ABS patterns to avoid inter-cell interference.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for interference coordination, comprising:
receiving a first macrocell almost blank subframe (ABS) pattern from a first macrocell;
receiving a second macrocell ABS pattern from a second macrocell;
determining a first small cell ABS pattern for a first small cell and a second small cell ABS pattern for a second small cell according to the first macrocell ABS pattern and the second macrocell ABS pattern;
transmitting the first small cell ABS pattern to the first small cell;
identifying first free time slots for the first small cell, second free time slots for the second small cell, and contested time slots according to the first macrocell ABS pattern, the second macrocell ABS pattern, and an interference relationship between the first macrocell, the second macrocell, the first small cell, and the second small cell; and
distributing the contested time slots for the first small cell and the second small cell according to a first load information of the first small cell, a second load information of the first small cell, the first free time slots, the second free time slots, and the contested time slots;
wherein the first small cell is within a coverage of the first macrocell.

2. The method according to claim 1, further comprising:
determining the second small cell ABS pattern for the second small cell according to the first macrocell ABS pattern and the second macrocell ABS pattern; and
transmitting the second small cell ABS pattern to the second small cell;
wherein the second small cell is within a coverage of the second macrocell.

3. The method according to claim 2, wherein a coverage of the first small cell overlaps a coverage of the second small cell.

4. The method according to claim 2, further comprising:
obtaining the interference relationship between the first macrocell, the second macrocell, the first small cell, and the second small cell;
wherein the first small cell ABS pattern and the second small cell ABS pattern are determined according to the interference relationship.

5. The method according to claim 4, further comprising:
receiving the first load information from the first small cell; and
receiving the second load information from the second small cell;
wherein the first small cell ABS pattern and the second small cell ABS pattern are determined according to the first load information and the second load information.

6. The method according to claim 1, further comprising:
receiving a first selected ABS pattern generated by the first small cell in response to the first small cell ABS pattern; and
transmitting the first selected ABS pattern to at least one of the first macrocell and the second macrocell.

7. The method according to claim 1, further comprising:
receiving a first request for ABS pattern information from the first small cell; and
transmitting a second request for the ABS pattern information to the first macrocell in response to the first request.

8. A network server, comprising:
an almost blank subframe (ABS) pattern management unit, configured to receive a first macrocell ABS pattern from a first macrocell, receive a second macrocell ABS pattern from a second macrocell, transmit a first small cell ABS pattern to a first small cell, and transmit a second small cell ABS pattern to a second small cell; and
a coordination unit, configured to determine the first small cell ABS pattern for the first small cell and the second small cell ABS pattern for the second small cell according to the first macrocell ABS pattern and the second macrocell ABS pattern;
wherein the first small cell is within a coverage of the first macrocell, and the coordination unit is further configured to
identify first free time slots for the first small cell, second free time slots for the second small cell, and contested time slots according to the first macrocell ABS pattern, the second macrocell ABS pattern, and the interference relationship between the first macrocell, the second macrocell, the first small cell, and the second small cell, and
distribute the contested time slots for the first small cell and the second small cell according to first load information of the first small cell, second load information of the second small cell, the first free time slots, the second free time slots, and the contested time slots.

9. The network server according to claim 8, wherein
the coordination unit is further configured to determine the second small cell ABS pattern for the second small cell according to the first macrocell ABS pattern and the second macrocell ABS pattern; and
the ABS pattern management unit is further configured to transmit the second small cell ABS pattern to the second small cell, the second small cell being within a coverage of the second macrocell.

10. The network server according to claim 9, wherein a coverage of the first small cell overlaps a coverage of the second small cell.

11. The network server according to claim 9, further comprising:
a topology management unit, configured to obtain the interference relationship between the first macrocell, the second macrocell, the first small cell, and the second small cell;
wherein the coordination unit determines the first small cell ABS pattern and the second small cell ABS pattern according to the interference relationship.

12. The network server according to claim 11, further comprising:
a load management unit, configured to receive the first load information from the first small cell and receive the second load information from the second small cell;
wherein the coordination unit determines the first small cell ABS pattern and the second small cell ABS pattern according to the first load information and the second load information.

13. The network server according to claim 8, wherein the ABS pattern management unit is further configured to
receive a first selected ABS pattern generated by the first small cell in response to the first small cell ABS pattern, and
transmit the first selected ABS pattern to at least one of the first macrocell and the second macrocell.

14. The network server according to claim 8, wherein the ABS pattern management unit is further configured to
receive a first request for ABS pattern information from the first small cell, and
transmit a second request for the ABS pattern information to the first macrocell in response to the first request.

15. A communication system, comprising:
a network server;
a first macrocell, connected to the network server, configured to transmit a first macrocell almost blank subframe (ABS) pattern to the network server;
a second macrocell, connected to the network server, configured to transmit a second macrocell ABS pattern to the network server; and
a first small cell, connected to the network server, and being within a coverage of the first macrocell;
wherein the network server is configured to
determine a first small cell ABS pattern for the first small cell and a second small cell ABS pattern for a second small cell according to the first macrocell ABS pattern and the second macrocell ABS pattern;
identify first free time slots for the first small cell, second free time slots for the second small cell, and contested time slots according to the first macrocell ABS pattern, the second macrocell ABS pattern, and the interference relationship between the first macrocell, the second macrocell, the first small cell, and the second small cell;
distribute the contested time slots for the first small cell and the second small cell according to first load information of the first small cell, second load information of the small cell, the first free time slots, the second free time slots, and the contested time slots; and
transmit the first small cell ABS pattern to the first small cell.

16. The communication system according to claim 15, further comprising:
the second small cell, connected to the network server, and being within a coverage of the second macrocell;
wherein the network server is further configured to determine the second small cell ABS pattern for the second small cell according to the first macrocell ABS pattern and the second macrocell ABS pattern, and transmit the second small cell ABS pattern to the second small cell.

17. The communication system according to claim 16, wherein a coverage of the first small cell overlaps a coverage of the second small cell.

18. The communication system according to claim 16, wherein the network server is further configured to obtain the interference relationship between the first macrocell, the second macrocell, the first small cell, and the second small cell to determine the first small cell ABS pattern and the second small cell ABS pattern.

19. The communication system according to claim 18, wherein
the first small cell transmits the first load information to the network server;

the second small cell transmits the second load information to the network server; and the network server determines the first small cell ABS pattern and the second small cell ABS pattern according to the first load information and the second load information.

20. The communication system according to claim 15, wherein the first small cell transmits a first selected ABS pattern to the network server in response to the first small cell ABS pattern; and the network server transmits the first selected ABS pattern to at least one of the first macrocell and the second macrocell.

21. The communication system according to claim 15, wherein the first small cell transmits a first request for ABS pattern information to the network server; and the network server transmits a second request for the ABS pattern information to the first macrocell in response to the first request.

* * * * *